United States Patent [19]
Breeden

[11] 3,885,835
[45] May 27, 1975

[54] WASTE DISPOSAL SYSTEM
[75] Inventor: John F. Breeden, Royston, Ga.
[73] Assignee: Hopeman Brothers, Inc., New York City, N.Y.
[22] Filed: Apr. 8, 1974
[21] Appl. No.: 458,804

[52] U.S. Cl................................. 302/39; 239/274
[51] Int. Cl............................................ B65g 53/04
[58] Field of Search ................. 302/27, 39; 239/274

[56] References Cited
UNITED STATES PATENTS
1,255,175    2/1918    Kellogg............................ 302/27 X
3,687,503    8/1972    Ekstrom et al. ..................... 302/39

Primary Examiner—M. Henson Wood, Jr.
Assistant Examiner—Michael Mar
Attorney, Agent, or Firm—Smith, Harding, Earley & Follmer

[57] ABSTRACT

A waste disposal system for paper towels or the like in which when wastepaper is deposited through a door into a waste depository chamber, it falls into a waste disposal passageway having a discharge outlet remotely located relative to the depository chamber. The movement of the door to permit the depositing of the wastepaper actuates an air valve which blows air through the disposal passageway to cause the wastepaper to be transported to the discharge outlet.

12 Claims, 5 Drawing Figures

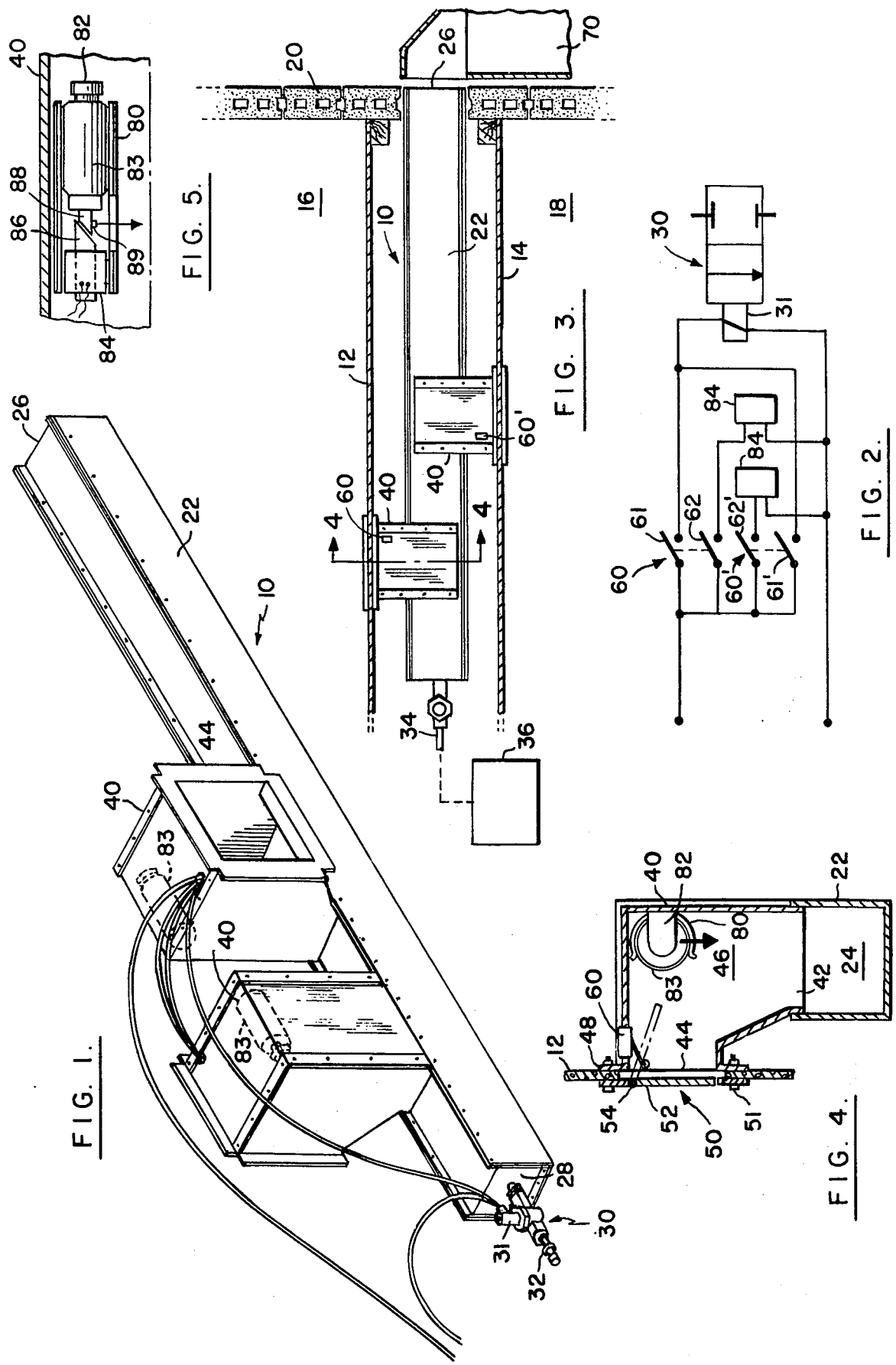

WASTE DISPOSAL SYSTEM

BACKGROUND OF THE INVENTION

This invention relates generally to waste disposal systems and more particularly to a waste disposal system for disposing of paper towels or the like from rooms such as various types of public facilities.

In public facilities, such as automobile service station washrooms, there is a constant problem of maintaining the facility clean of wastepaper and trash such as paper towels. Often the trash cans which are provided in these facilities are insufficient to handle the paper towels and other trash which is to be disposed of. Accordingly, such facilities become unclean and unsanitary and present an unsightly appearance to a user thereof.

SUMMARY OF THE INVENTION

It is the general object of this invention to provide a waste disposal system which will serve to maintain a public facility room in a clean condition and provide for the disposal of waste such as paper towels and other trash therefrom.

Briefly stated, the general object of the invention is achieved by the provision of a waste disposal system which comprises means providing a waste discharge passageway, means defining a waste depository chamber having an inlet opening adapted to receive the waste to be disposed of and an outlet opening which communicates with the waste discharge passageway. Door means are provided to extend across the inlet opening, such door means being mounted for movement from a normal position extending across the inlet opening and a clear position permitting the delivery of wastepaper through said opening into said depository chamber. Air means are provided for directing a flow of air through the waste discharge passageway in response to the opening of the door means to transport the waste item, such as a paper towel, through the waste discharge passageway to a discharge location to dispose of the waste. Control means are provided to achieve this desired mode of operation.

BRIEF DESCRIPTION OF THE DRAWINGS

FIG. 1 is a perspective view of a waste disposal system in accordance with the invention;

FIG. 2 is a wiring diagram of a control system for use in the waste disposal system in accordance with the invention;

FIG. 3 is a plan view of a waste disposal system as shown in FIG. 1 installed between a pair of washrooms;

FIG. 4 is a sectional view taken on line 4—4 of FIG. 3; and

FIG. 5 is a view of a detail.

DESCRIPTION OF THE PREFERRED EMBODIMENT

While the waste disposal system of the invention will be described herein as designed for use with the washrooms of a service station it will be apparent that the invention has more general application.

Referring to FIG. 3, a waste disposal unit 10 in accordance with the invention is located between the wall panels 12 and 14 of a pair of rooms 16 and 18, respectively, which, typically, may be the washrooms of a service station. The outside wall of the washrooms is indicated at 20. The unit 10 comprises a rectangular-shaped, horizontally extending duct 22 which defines an elongated waste disposal passageway 24 which is open at one end 26, such end forming the discharge of the passageway 24. The other end of duct 22 is closed by an end plate 28. The wall panels 12 and 14 form the dividing wall between the adjacent washrooms of a service station.

Means are provided for directing the flow of air through the waste disposal passageway 24. To this end, there is provided a normally closed, solenoid-operated valve 30 which is mounted on the end plate 28 to deliver its outlet flow of air into the end of the waste disposal passageway 24. Valve 30 has an air connection 32 on its inlet side adapted to receive an air supply hose 34. The air supply hose 34 extends between connection 32 and a suitable high pressure air supply source 36 for conveying high pressure air to the inlet side of the valve 30. In service stations, the compressor normally used for filling tires and for operating tools can be used as the high pressure air supply source.

Associated with each of the rooms 16 and 18 there is provided means for receiving the waste to be disposed of from these rooms by delivering such waste to the waste disposal passageway 24. Such means comprises a pair of box-like waste receivers 40, one of which is associated with each of the rooms 16 and 18 as is apparent from FIG. 3.

Each waste receiver 40 is mounted on the top wall of duct 22 to extend therethrough as shown in FIG. 4 and is provided with a bottom opening 42 providing communication between the waste disposal passageway 24 and a waste depository chamber 46 formed internally of the waste receiver 40. Each waste receiver 40 is provided with a side opening 44 aligned with a corresponding opening formed in the associated walls 12 and 14 as is shown in FIG. 4. By this arrangement, waste can be deposited into the waste depository chamber 46 through the side opening 44 whereby such waste will fall through the bottom opening 42 into the waste disposal passageway 24.

Associated with each waste receiver 40 is a door means 50 mounted on a border portion 48 extending around the inlet opening 44 by means of suitable mounting bolts 51. The door means 50 comprises a door 52 which is pivoted on a horizontally extending hinge 54 and normally hangs vertically downwardly from the hinge to extend across the opening 44 to thereby close such opening. The door 52 is mounted for pivotal movement from the vertical position inwardly into chamber 46 to the dashed line position shown in FIG. 4 to thereby clear the opening 44 to permit the delivery of waste therethrough into chamber 46. The outside face of the door 52 is provided with a suitable marking, such as "PUSH", providing instructions for the disposal of waste.

Control means are provided for actuating the valve 30 to effect the blowing of air through the waste disposal passageway 24 in response to the movement of the door 52 to clear the opening 44 for the depositing of waste into chamber 46. To this end, there is provided a control circuit as shown in FIG. 2 comprising a pair of double-pole single-throw microswitches 60 and 60', one associated with each waste receiver 40 and positioned therein to be contacted by the door 52 when it is moved from the closed position toward the clearing position, such contact causing the microswitches 60 and 60' to be actuated from a normally open position to a closed position. As shown in FIG. 2, the microswitches 60 and 60' are connected in parallel relative to one another and in series with the power source, and the solenoid 31 of the valve 30 is connected to the power source through either of the contacts 61 and 61' of the microswitches 60 and 60', respectively. By this arrangement, when either of the microswitches 60 and 60' is closed, the solenoid 31 is energized to actuate the valve 30 from its normally closed position to an open position allowing the flow of air through the valve 30.

A suitable waste receiving container 70 is mounted outside the washrooms 16 and 18 and is adapted to receive waste products discharged through the end 26 of the waste disposal unit 10.

Means are provided for delivering a deodorizing and sanitizer spray into the waste depository chambers 46 in conjunction with the air blast. To this end, each waste receiver 40 has a spring clip holder means 80 and a positioning member 82 suitably mounted in each chamber 46 at the upper end thereof as shown in FIG. 4. Removably positioned within each holder 80 is an aerosol disinfectant dispenser 83, the bottom of which is contacted by member 82. A solenoid means 84 is secured in position adjacent each dispenser 83 by suitable means. The actuator arm 86 of each solenoid 84 and the depressible dispensing head 88 of each dispenser 83 are aligned and have cooperable truncated ends as shown in FIG. 5. This arrangement insures that the dispenser 83 must be positioned into the holder 80 with the dispensing nozzle 89 thereof facing downwardly to direct its disinfectant spray downwardly into the chamber 46 as is shown by the arrows in FIGS. 4 and 5. Each of the solenoids 84 is connected to the power source through one of the contacts 62 and 62' of the microswitches 60 and 60', respectively, mounted in the associated chamber 46. By this arrangement, when one of the microswitches 60 and 60' is closed by an opening movement of its associated door 52, the associated solenoid 84 is energized to move its actuator rod 86 toward the dispensing head 88 to depress the same whereby a disinfectant spray is delivered downwardly into the associated chamber 46.

In the operation of the waste disposal unit in accordance with the invention, when a person in either of the washrooms 16 and 18 decides to dispose of wastepaper or the like, he will simply insert the wastepaper into the chamber 46 by hand. This involves pushing the door 52 inwardly from the vertical position to a position such as the dashed line position shown in FIG. 4 and releasing the paper within the chamber 46. The wastepaper will then fall from chamber 46 through the bottom opening 42 into the waste disposal passageway 24. When the door 52 is pivoted to the clearing position the associated microswitch 60 or 60' will be moved to the closed position to thereby cause energization of the solenoid 31 of valve 30 to actuate the valve 30 to the open position. When this occurs, air flows through the valve 30 into the one end of duct 22 to blow through the passageway 24 from one end to the other. This flow of air serves to transport any wastepaper in passageway 24 through its elongated extent and out of the open discharge end 26 thereof. The paper discharged from end 26 will fall into the container 70 located externally of the washrooms. It will be apparent that the movement of either door 52 during the disposal of waste from either of the rooms 16 and 18 through an associated waste receiver 40 will serve to cause the actuation of the air valve to blow air through the passageway 24. Moreover, it is noted that in the event that the wastepaper is not blown from the chamber 24 during the time when such wastepaper is discarded, this paper will be disposed of when either of the doors 52 of the two waste receivers 40 is opened during a subsequent wastepaper discarding operation.

The closing of the microswitch 60 or 60' associated with the opened door 52 also causes energization of the solenoid 84 associated therewith. The energized solenoid 84 causes movement of its actuator arm 86 to depress the dispensing head 88 of an associated dispenser 83 to thereby cause the delivery of a disinfectant spray downwardly into the associated chamber 46.

It is noted that the waste disposal unit in accordance with the invention is particularly applicable for use in service stations for disposing of the waste from the washrooms thereof since service stations already have a source of high pressure air and an appropriate electrical source. However, the waste disposal unit may have various other applications which will be obvious to one skilled in the art.

The waste disposal unit in accordance with the invention is far superior to the waste disposal containers in use today since the waste is removed directly to a disposal area with no handling required by any cleanup personnel. Moreover, one system is easily adapted for servicing a plurality of rooms. Furthermore, the design lends itself to a tamper-proof installation to avoid the problems of vandalism.

Another advantage of the system of the invention is that with only minor modification the system could be utilized as a room air exhaust system by keeping a minimum amount of air flowing through the duct work.

Furthermore, it will be apparent that various changes may be made in the construction and arrangement of parts without departing from the scope of the invention.

I claim:

1. A waste disposal system for paper towels or the like comprising means providing an elongated waste disposal passageway, means defining a waste depository chamber having an inlet opening adapted to receive waste to be disposed of and an outlet opening communicating with said disposal passageway, door means extending across said inlet opening and mounted for movement from a normal position extending across said inlet opening and an open position permitting the depositing of waste through said inlet opening into said depository chamber, air means for directing the flow of air through said disposal passageway past said outlet opening to transport waste delivered into said disposal passageway from said depository chamber to a remote location for disposal thereof, and control means responsive to the movement of said door means toward said open position to actuate said air means to effect the blowing of air through said waste disposal passageway.

2. A waste disposal system according to claim 1 wherein said air means includes a normally closed control valve arranged with its outlet in communication with one end of said waste disposal passageway, the inlet of said control valve being adapted to be connected to a source of air under pressure.

3. A waste disposal system according to claim 2 wherein said control means includes switch means adapted to be contacted by said door means as it moves towards said open position and a control circuit including said switch means for actuating said control valve from its closed to its open position when said switch is contacted by said door means.

4. A waste disposal system according to claim 1 wherein said means for providing said waste disposal passageway includes an elongated duct, and said means defining said waste depository chamber comprises a container mounted on said duct.

5. A waste disposal system according to claim 4 wherein said duct and said container are adapted to be mounted as a unit behind the side wall of a washroom or the like with the inlet opening of said waste depository chamber facing the interior of said washroom.

6. A waste disposal system according to claim 1 including means defining a second waste depository chamber having an inlet opening adapted to receive waste to be disposed of and an outlet communicating with said waste disposal passageway, and door means extending across said inlet opening of said second depository chamber and mounted for movement from a normal position extending across said inlet opening and an open position permitting the depositing of waste through said inlet opening into said second depository chamber, said control means including means responsive to the movement of said last-mentioned door means toward its open position to actuate said air means to effect the blowing of air through said waste disposal passageway.

7. A waste disposal system according to claim 6 wherein said air means includes a normally closed control valve arranged with its outlet in communication with one end of said waste disposal passage, the inlet of said control valve being adapted to be connected to a source of air under pressure.

8. A waste disposal system according to claim 7 wherein said control means includes switch means adapted to be contacted by either of said door means as it moves toward said open position and a control circuit including said switch means for actuating said control valve from its closed to its open position when said switch is contacted by said door means.

9. A waste disposal system according to claim 6 wherein said means for providing said waste disposal passage includes an elongated duct, and said means defining said waste depository chamber comprises a container mounted on said duct.

10. A waste disposal system according to claim 9 wherein said duct and said container are adapted to be mounted as a unit between the dividing wall of a pair of adjacent washrooms or the like with the inlet opening of each said waste depository chamber facing the interior of one of said washrooms.

11. A waste disposal system according to claim 1 including means for delivering a spray of disinfectant into said depository chamber in response to the opening of said door means.

12. A waste disposal system according to claim 6 including means for delivering a spray of disinfectant into either of said depository chambers in response to the opening of said door means associated therewith.

* * * * *